Aug. 17, 1954  F. E. FLIS  2,686,371
HOLE LOCATOR
Filed May 11, 1953

Frank E. Flis
INVENTOR.

BY Clarence A. O'Brien
and Harvey B. Jacobson
Attorneys

Patented Aug. 17, 1954

2,686,371

UNITED STATES PATENT OFFICE 2,686,371

HOLE LOCATOR

Frank E. Flis, Cleveland, Ohio

Application May 11, 1953, Serial No. 354,077

3 Claims. (Cl. 33—174)

This invention relates to a hole locator and particularly to a locator for positioning a drill with respect to a metal object without the necessity of scribing pre-drilling or other exploratory set-ups.

Many machining, and practically every tool making job requires accurately spaced holes such as the holes in jig fixtures and the like.

The various methods heretofore known for locating such holes have been extremely complex and require either involved mathematics or involved techniques such as punching basic holes and tapping or drilling various locations before the actual location of the desired hole can be determined.

The present invention relates to a hole locator usable to positively locate a drill or any other cutting tools with relation to a hole to be drilled, bored, or reamed, etc. The construction according to the invention comprises a non-magnetic shell having a perfectly true work face at right angles to the axis of the shell and having a permanent magnet of considerable strength located therein and having pole pieces extending to the true surface. An axially projecting point is placed on the other end of the device and the locator may be spaced by means of any suitable measuring device to the exact position desired after which the work piece will be placed on the bed of the machine or the locator can be set and spaced on work piece which has already been clamped to bed of machine, and a feeler gauge, or dial indicator is utilized to center the spindle directly over the projecting point by feeling or indicating the outside diameter of locator. Projecting cone point can be used for visual means of lining up drill.

It is accordingly an object of the invention to provide an improved hole locator.

It is a further object of the invention to provide a hole locator which may be directly positioned without any preliminary measurements.

It is a further object of the invention to provide a hole locator which will be self-supporting on a work piece.

It is a further object of the invention to provide a hole locator which may be protected when not in use.

Other objects and many of the attendant advantages of the present invention will be apparent from the following detailed description taken in conjunction with the accompanying drawing, in which.

Figure 1:
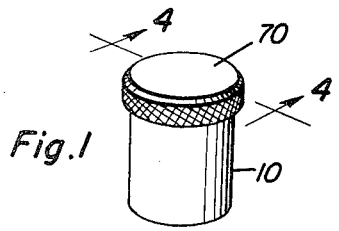
Figure 1 is a perspective view of the hole locator according to the invention.
Figure 2:
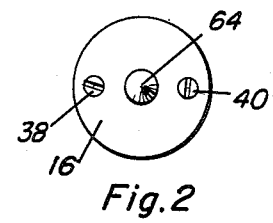
Figure 2 is a top plan view of the hole locator.
Figure 3:
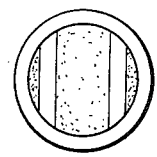
Figure 3 is a bottom plan view of the hole locator.
Figure 4:
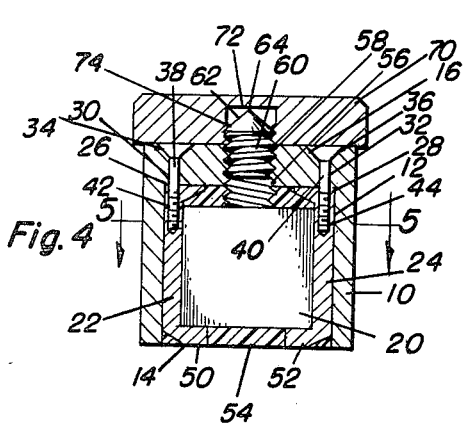
Figure 4 is a sectional elevation through the locator taken substantially on the plane indicated by the line 4—4 of Figure 1.
Figure 5:
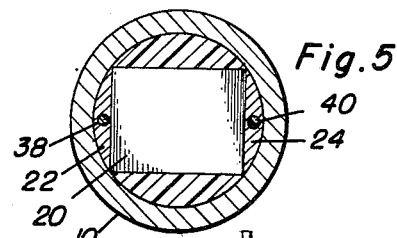
Figure 5 is a cross-section through the locator taken substantially on the plane indicated by the line 5—5 of Figure 4.

In the exemplary embodiment according to the invention the hole locator comprises a body 10 preferably of aluminum or other non-magnetic material having a cylindrical body opening 12 therein and having one end 14 substantially open. The open end 14 being a true plain surface directly perpendicular to the axis of the cylinder 10. The opposite end 16 of the cylinder 10 is substantially closed and is also of substantially non-magnetic material such as aluminum or bronze and is shown as integral with the side walls of the cylinder 10.

The permanent magnet 20 is located within the body 10 and has its poles located transversely of the longitudinal axis of the cylinder. Pole pieces 22 and 24 are in contact with the pole ends of the magnet 20 and have ends 26 and 28 in rigid contact with the end 16 of the shell.

The end 16 is provided with a pair of apertures 30 and 32 having countersunk recesses 34 and 36 thereabout. Screws 38 and 40 extend through the apertures 30 and 32 and are threadedly engaged in threaded apertures 42 and 44 in the pole pieces 22 and 24, respectively.

In turn, pole ends 50 and 52 are provided on the pole pieces 22 and 24, respectively, and are accurately aligned in the opening in the end 14 of the body 10.

Insulating material 54 is poured into the recesses in the end 14 so that the end 14 is sealed in perfectly smooth relation so that iron filings and other material will be incapable of working inside of the locator.

While at present it is preferred to use a plastic material for the filler 54, obviously any non-magnetic material either metallic or non-metallic may be utilized to make the smooth flush surface on the end 14.

The end 16 is provided with an axial aperture 56 having threads 58 therein. A threaded pin 60 is assembled in threaded relation to the aperture 56. The pin 60 is provided with a conical end 62 having a point 64 exactly axially arranged with respect to the body 10.

The protective cap 70 of non-magnetic material is provided with a bore 72 having an internal thread 74 for engagement with the pin 60 so that the cap 70 may be threadedly engaged with the pin 60 to protect the point 64 of the pin.

Figure 6:
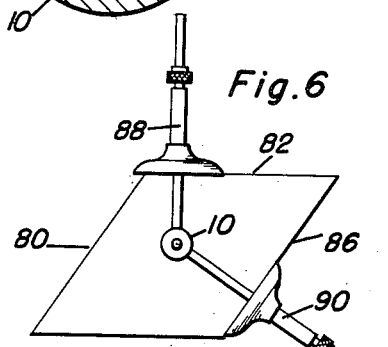
Figures 6 to 9, inclusive, are various means illustrating the use of the locator with simple measuring devices.

When utilizing the hole locator to locate a hole in any regular or irregular piecce such as the trapezoidal piece 80 of Figure 6, having angularly disposed edges 82 and 86 with a hole 84 to be located a predetermined distance from the edge 82 and likewise a predetermined distance from the edge 86. A pair of depth gauges 88 and 90 are adjusted to the desired depth less half the diameter of the shell 10 and adjusted along the edges 82 and 86 until they both make exact contact with the shell 10. The magnet 20 and the shell 10 will retain the locator firmly on the plate 80.

Figure 7:
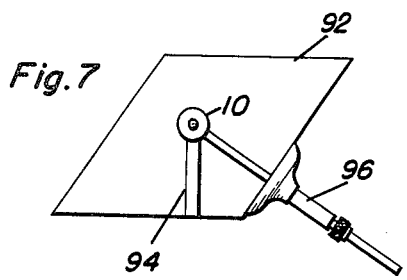
Figure 8:
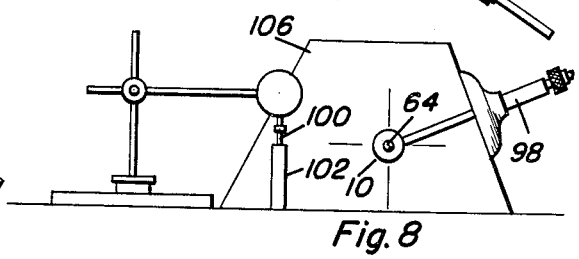

Instead of using a plurality of depth gauges, a combination of various gauges may be utilized and in Figure 7 a work piece 92 has a so-called Jo block 94 applied thereto and a depth gauge 96 so that the shell 10 may be properly located on the piece.

Instead of utilizing the Jo block directly to locate the shell 10 any suitable gauge such as the depth gauge 98 may be utilized to locate the shell 10 with respect to one edge of the work piece and a feeler gauge device 100 may be set by means of a Jo block 102 and utilized to feel the projection 64 if for some reason one edge of the work piece 106 cannot be utilized.

Figure 9:
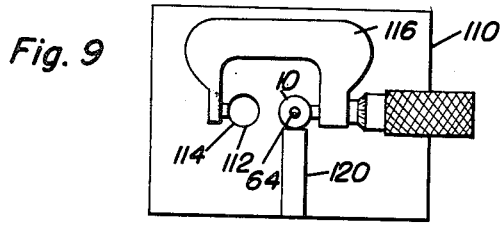

In the modification according to Figure 9, the device is utilized to locate a pair of positively positioned holes with respect to each other. The work-piece 110 has a first hole 112 located therein by any of the previous described methods after which a plug 114 is mounted therein and caliper 116 is connected over the plug 114 and the shell 10 and a Jo block 120 is utilized to locate the shell 10 with respect to the edge of the piece so that the point 64 will be properly located not only with respect to the work piecce 110 but exactly positioned with respect to the first hole.

It will, therefore, be apparent that the present invention provides a locator for rapidly and accurately locating holes without any mathematical analysis or previous manipulation of the piece.

While for purposes of exemplification a particular embodiment of the invention has been shown and described according to the best present understanding thereof, it will be apparent to those skilled in the art that changes in modifications and arrangement and construction of the parts thereof may be made without departing from the true spirit and scope of the invention.

What is claimed as new is as follows:

1. A hole locator comprising a cylindrical shell of non-magnetic material, one end of said shell being substantially open and the other end of said shell being substantially closed, a magnet disposed transversely in said shell, pole pieces contacting said magnet, said pole pieces being secured to the closed end of said shell and extending to the open end of the shell, said open end of said shell being disposed perpendicular to the axis of said shell, an axially disposed threaded aperture in said closed end of said shell, a conical pointed pin threadedly engaged in said aperture.

2. A hole locator comprising a cylindrical shell of non-magnetic material, one end of said shell being substantially open and the other end of said shell being substantially closed, a magnet disposed transversely in said shell, pole pieces contacting said magnet, said pole pieces being secured to the closed end of said shell and extending to the open end of the shell, said open end of said shell being disposed perpendicular to the axis of said shell, an axially disposed threaded aperture in said closed end of said shell, a conical pointed pin threadedly engaged in said aperture, a non-magnetic protector plate having a threaded axial bore therein adapted for threaded engagement with said pin.

3. A hole locator comprising a cylindrical shell of non-magnetic material, one end of said shell being substantially open and the other end of said shell being substantially closed, a magnet disposed transversely in said shell, pole pieces contacting said magnet, said pole pieces being secured to the closed end of said shell and extending to the open end of the shell, said open end of said shell being disposed perpendicular to the axis of said shell, an axially disposed threaded aperture in said closed end of said shell, a conical pointed pin threadedly engaged in said aperture, a filling of non-magnetic material sealing the open end of said shell.

References Cited in the file of this patent

UNITED STATES PATENTS

| Number | Name | Date |
| --- | --- | --- |
| 2,419,134 | Hall | Apr. 15, 1947 |
| 2,496,099 | Leto | Jan. 31, 1950 |
| 2,519,435 | Byrd | Aug. 22, 1950 |